Dec. 13, 1938.  M. J. CONNOLLY  2,140,399

COTTON HARVESTING MACHINE

Original Filed Feb. 27, 1932  2 Sheets-Sheet 1

Inventor

M. J. Connolly

By Semmes & Semmes

Attorney

Dec. 13, 1938.  M. J. CONNOLLY  2,140,399
COTTON HARVESTING MACHINE
Original Filed Feb. 27, 1932  2 Sheets-Sheet 2

Inventor
MARTIN J. CONNOLLY
By Semmes & Semmes
Attorneys

Patented Dec. 13, 1938

2,140,399

UNITED STATES PATENT OFFICE 2,140,399

COTTON HARVESTING MACHINE

Martin J. Connolly, New York, N. Y.

Application February 27, 1932, Serial No. 595,605
Renewed May 20, 1938

9 Claims. (Cl. 56—28)

The present invention relates to the harvesting of cotton and more particularly has reference to methods and apparatus for harvesting cotton in which the cotton is picked from the cotton bolls.

It has long been recognized that the output by cotton growers is dependent upon manual labor for picking the cotton from the bolls and is limited because of the cost of the picking of the cotton, and because of the low rate of output, due to the manual picking. Many developments have been made in the art which seek to avoid the disadvantages of manual picking. The devices which were first developed, while overcoming some of the difficulties due to manual picking, nevertheless, were disadvantageous due to the fact that the quality of the cotton harvested by the machines was inferior to that which was picked by hand.

The first type of cotton harvesting machines was termed "cotton sleds". These devices harvested the cotton in a different manner than when the cotton was manually picked. In other words, the sleds remove the cotton bolls as well as the cotton contained therein. The sleds which were somewhat similar to a tooth comb, stripped all of the bolls from the cotton plant and in addition, gathered a considerable amount of trash which was undesirable. One of the outstanding disadvantages of this type of machine is due to the fact that the bolls of cotton which were not matured were removed from the cotton plant as well as the completely matured bolls. Another disadvantage of this type of cotton harvesting is due to the fact that the ordinary cotton gins were not suitable for handling the cotton bolls together with the cotton.

Subsequently, another type of cotton harvesting machine was developed in which the cotton was picked from the bolls. The cotton picker differs essentially from the cotton sleds and cotton strippers in that it picks the cotton from the boll in much the same manner as the cotton is picked by hand. Two types of cotton pickers have been developed, one which removes the cotton from the bolls by mechanically engaging the cotton and removing the same from the boll. Another type depends upon the principle of agitating the cotton plant to loosen the cotton therefrom, and then harvesting the cotton by sucking or drawing the cotton from the zone of agitation into a storage or harvesting receptacle. The cotton pickers as distinguished from the cotton strippers are obviously the most useful in that the cotton harvested by these types of machines is of better quality than the cotton harvested by the so called strippers.

In the cotton pickers, the device containing the mechanism for picking the cotton from the bolls is moved through the cotton field and contacts with the cotton plants. While these devices are satisfactory for most purposes, they, nevertheless, often times fail to completely remove the cotton from the cotton bolls. Also the mechanisms operate when passing over plants which have not matured as much as other plants in the field, and therefore, time and energy necessary for operation of the machine is wasted.

The present invention seeks to overcome the disadvantages of the prior art by providing methods and apparatus for harvesting cotton in which the operation of the mechanism is controlled by a device which is affected by the presence of the matured cotton bolls.

A major object of the present invention is to provide a method and apparatus for harvesting cotton wherein the removal of the cotton from the bolls of the cotton plant is controlled by a light responsive element.

Another object of this invention is to provide an apparatus for harvesting cotton wherein the operation of the device is controlled by means of a photoelectric cell, which is responsive to the presence of matured cotton bolls.

Yet another object of this invention is to provide a cotton picker of the mechanical type which is controlled by a photoelectric cell responsive to light rays reflected from matured cotton bolls.

Still another object of this invention is to provide a pneumatically operated cotton picker in which the operation of the cotton picker is controlled by a photoelectric cell responsive to light rays reflected from mature cotton bolls.

A still further object of this invention is to provide a combined mechanical and pneumatic device in which the operation of the picker is controlled by a photoelectric cell responsive to light rays reflected from matured cotton bolls.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

The present invention resides in the association with the cotton picking mechanism of either the mechanical and/or pneumatic type of a device responsive to light rays reflected by ripened or matured cotton bolls for controlling the operation of the cotton pickers. In one form of the present invention, the light responsive device is associated with a cotton picker of the pneumatic type. In this type of apparatus, the device is moved over a cotton plant, and if there are any matured cotton bolls on the plant, light from a suitable source is reflected by the cotton bolls and the rays so reflected affect a light responsive device, such as a photoelectric cell, which in turn controls the operation of the cotton picker.

In one preferred form of mechanism, the photoelectric cell may control a valve in a conduit leading to a suction blower. Thus, if the light responsive device is actuated by the reflection of light from the matured bolls, the valve will be actuated to permit the suction created by the suction blower to draw the matured cotton into a suitable receptacle.

In addition to the above form of cotton picker, the present invention also comprehends a combined mechanical and pneumatic cotton picker in which the cotton plants are first subjected to the action of the mechanical picker to remove as much of the cotton as is possible, and then are subjected to the action of the pneumatically operated cotton picker, the operation of which is controlled by the light responsive device.

Still another form of the present invention resides in the application of a light responsive device to a mechanical picker for controlling the operation of the same. In this form of the invention, the light responsive device could be associated with the mechanism to control the rotation of the cotton gathering spindles. In the operation of this device, if there were no matured cotton bolls on the plant, the spindles could operate in moving through the plant without rotation so that there would be no abrasive action of the spindles on the unmatured cotton bolls.

In order to make my invention more clearly understood, I have shown in the accompanying drawings, means for carrying the same into practical effect, without limiting the improvements in their useful applications to the particular constructions, which for the purpose of explanation, have been made the subject of illustration.

Figure 1:
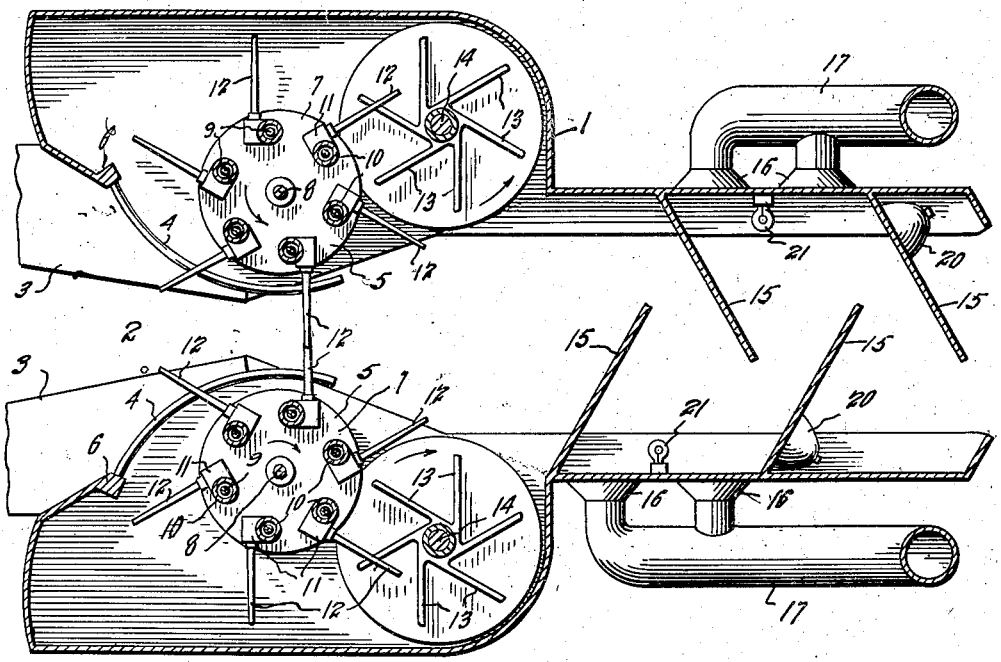
Figure 1 is a fragmentary horizontal sectional view of a machine constructed in accordance with the present invention.
Figure 2:
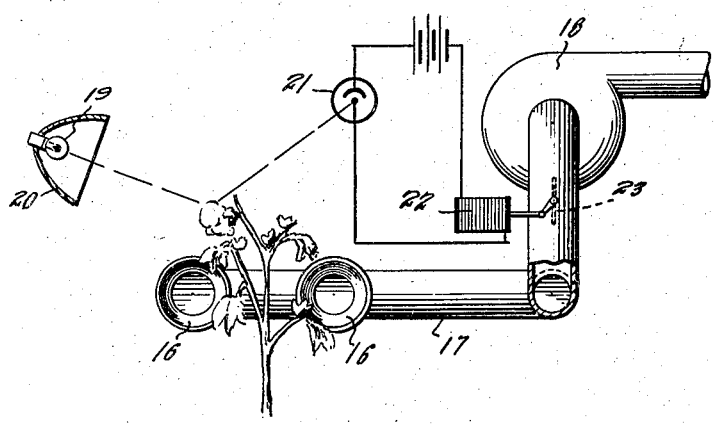
Figure 2 is a fragmentary vertical sectional view of the pneumatic portion of the apparatus shown in Figure 1.
Figure 3:
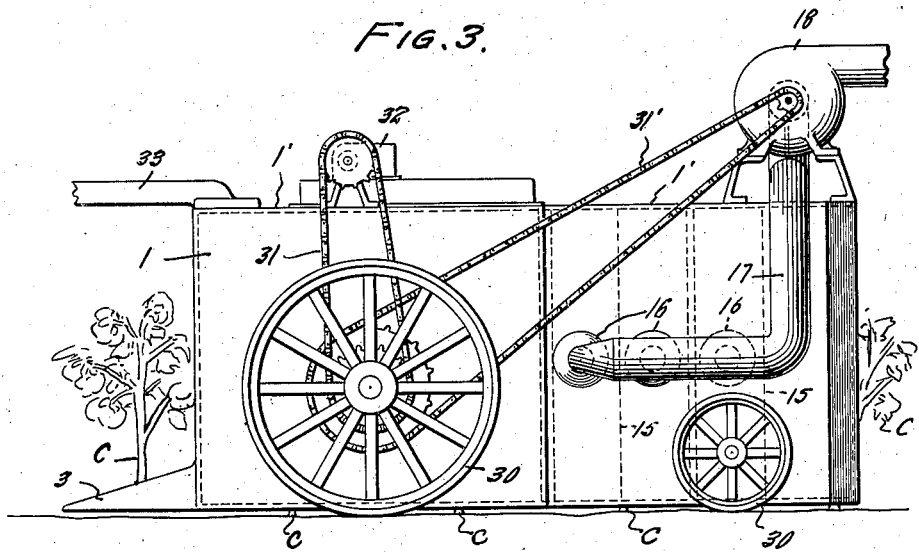
Fig. 3 is a side view of the harvesting machine.

As clearly shown in Figures 1, 2 and 3 one form of apparatus constructed in accordance with the present invention consists in the association of a pneumatic cotton picker with a mechanical cotton picker. A machine consisting of this type of combination is useful in that the cotton which is not gathered by the mechanical picker and which is matured will be gathered by the pneumatic picker.

Both the mechanical picker and the pneumatic picker are mounted on a conventional cotton harvesting machine chassis which is so constructed that the cotton plants C will be straddled in the passage of the machine through the cotton fields. The chassis is mounted on wheels 30 as shown in Fig. 3, and which may be of any conventional type. This machine may be power driven by a source of power, not shown, which is mounted on the chassis or may be drawn by a tractor through the medium of the draw bar 33 in the conventional manner.

A casing including the side members 1 and the roof or top cover 1' is mounted on the chassis and is so formed as to enclose the cotton plants straddled by the machine in passing through the cotton field. As clearly shown in Figure 1, the casing extends about the forward end of the machine and is formed to provide a narrow opening 2 through which the cotton plants C extend as the machine passes over the plants. Similarly a narrow opening 21 is provided in the rear end of the harvester through which the plants C pass, as shown in Fig. 3. The forward end of the machine is provided with the "feelers" or guides 3 together forming a tapered guide way leading to the constricted opening 3' for centering the cotton plants in the machine while the cotton is being picked therefrom by the mechanical pickers. Additional guides or gratings 4 are positioned forward of the mechanical picking devices 5.

The gratings 4 consist of a plurality of horizontally extending cantilever bars. These bars are carried by the vertical supports 6, attached to the casing walls 1, and are vertically spaced to permit movement of the spindles 12 of the mechanical pickers between adjacent bars. Gratings 4 in addition to centering the cotton plant for the mechanical pickers, also prevent premature engagement of the plants with the pickers.

Mechanical pickers 5 consist of upper and lower discs 7 fixed to the vertical shafts 8. Spaced about the shaft 8 are a plurality of vertically extending shafts 9 encased in housings 10. Housings 10 are fixed to the discs 7 and move therewith. At spaced vertical intervals, the housings 10 are provided with gear boxes 11. Each gear box has a horizontally extending spindle 12 mounted therein carrying a gear which meshes with a gear carried by the shaft 9. With this arrangement, which is well known in the art, rotary motion from shaft 9 will be transmitted to the spindles and cause them to rotate.

Spines or other cotton engaging members are provided on the surface of the spindles so that as the spindles rotate, the cotton from the bolls will be wound thereabout. In operation, the machine moves to the left as shown in Figure 1, and the discs 7 rotate in the direction indicated by the arrows. The housings carrying the plurality of spindles, of course, move with the discs. It has been found preferable to rotate the spindle carrying mechanism at such a speed that there is no relative movement between the spindles and the cotton plants as the machine moves through the cotton field, except the rotary movement of the spindles about their own axes.

As the machine moves through the cotton field astraddle of the cotton plants, the spindles engage the cotton, and due to the rotation of the spindles by motion from a suitable source transmitted through the shafts 9, cause the cotton to wind about the spindles.

When the spindles have moved clear of the cotton plant, they are caused to rotate in an opposite direction about their own axes to unwind the cotton. While rotating in the reverse direction, the cotton is stripped from the spindles by the fingers 13. These fingers are mounted on a rotatable shaft 14 and are vertically spaced so as to pass between the vertically spaced spindles. The fingers clean the cotton from the spindles and deposit the same in a receptacle not shown.

Figure 4:
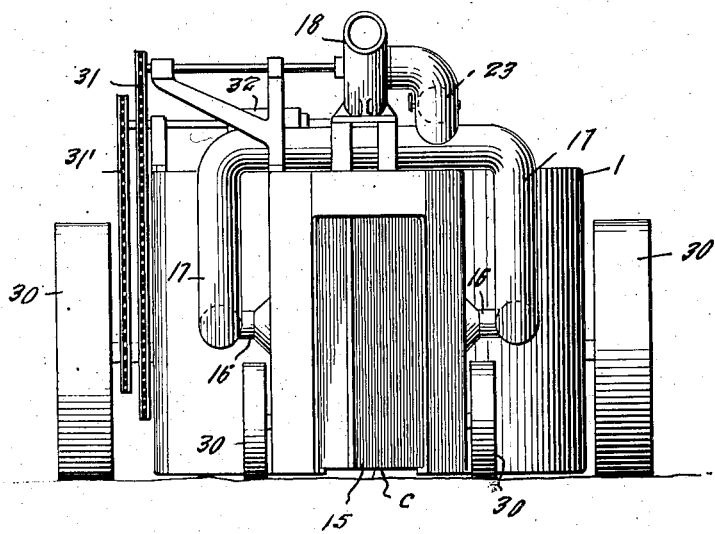
Fig. 4 is a rear elevation of the machine.

As hereinbefore mentioned, the casing 1 houses a pneumatic cotton picker which is preferably positioned at the rear end of the machine. In this type of picker, the interior of the casing is provided with a plurality of baffles, preferably extending substantially the full depth of the machine, as shown in Fig. 3. As shown in Fig. 1 the baffles 15 are placed on an angle and in overlapping relationship. As the machine moves over the cotton plants, the baffles 15 cause the cotton plant to weave or be agitated, thereby loosening the matured cotton bolls. Inasmuch as the baffles overlap and extend the full depth of the machine they serve, together with the side walls and roof, to form a darkened chamber. The exclusion of light may be made more complete by any suitable additional means, such as flexible flaps of canvas positioned on the interior of the side walls 1, to the rear of the mechanical picker. Likewise the light exclusionary action of the rearward vanes 15 may be supplemented by additional flaps of flexible material, such as canvas and so forth. It will be noted, as shown in Figs. 3 and 4, that the side walls 1 extend down very closely adjacent the ground line, thus serving as a box-like enclosure shielding the plants C, within the machine, from light. The side walls of the casing 1 are provided with openings which communicate by means of the funnel shaped conduits 16 with a main conduit or header 17 which is connected to the suction or intake part of a pump or blower 18 driven from any suitable source of power. When the pump 18 is in operation, any cotton that is loosened from the plant will be drawn into the headers 17 toward a receptacle not shown.

A novel manner of controlling the drawing or suction action on the cotton plant is provided by the present invention. This consists in the positioning in the substantially dark casing of a light source 19 provided with a parabolic reflector 20 for directing the rays of light from the source and a light responsive device 21, such as a photoelectric cell out of the path of light directed by the reflector. By using an efficient parabolic reflector the emittent rays are parallel to the axis and hence do not impinge upon the photo-electric cell 21. As long as there is no object in the path of the directed light from the source 19, there will be no light reflected toward the tube or cell 21. The cotton plant with unmature bolls will not reflect sufficient light to affect the tube 21. However, if the light falls on an open boll of cotton, sufficient light will be reflected thereby to materially affect the tube or cell 21, thereby changing its electrical characteristics.

In Figure 2, there is shown an arrangement wherein tube or cell 21 is connected in an electrical circuit with a solenoid 22 which controls valve 23 in conduit 17. Valve 23 is normally in a closed position, and is adapted to be opened when a cotton plant containing open cotton bolls is in the casing 1 at a point when light from the source 19 will be reflected on the tube 21. While the photoelectric cell has been described as being located in a circuit to control valve 23, it is to be understood that it is also within the contemplation of this invention to associate the light responsive device with circuits for controlling the operation of the blower.

The motive power for the mechanical cotton picker, that is to say the rotating disc 7 and the associated shafts 9 and spindles 12, may be of any desired type, a conventional form of which is shown in Fig. 3. The power for driving the mechanical picker may be taken off from one of the ground wheels 30 by means of any suitable transmission 31 and thence through the transmission gearing 32 to the shaft 8 (Fig. 1). If desired also power for operating the blower 18 may likewise be taken off from the ground wheel 30 by utilizing the motion transmission means, such as the belt 31'. This type of driving mechanism is conventional in the art and needs no further description.

It is also within the contemplation of this invention to associate the circuit controlled by the photoelectric tube 21 with any other means for controlling the operation of the pneumatic cotton picker.

While in the foregoing disclosure, reference has been made to a combined mechanical and pneumatically operated cotton picker, I wish it to be clearly understood that a cotton picker may be constructed in accordance with this invention, which involves only the pneumatic type of cotton picker as hereinbefore described. In this instance, a pneumatic cotton picker as disclosed in the rear portion of the apparatus shown in Figure 1 will comprise the entire machine. Since the operation of this type of machine would be the same as the pneumatic portion of the apparatus shown in Figure 1, a detailed description of the operation is believed to be unnecessary.

While I have not shown in the drawings, any control of the mechanical portion of the cotton picker shown in Figure 1, it is also within the scope of this invention to associate a source of light and a photoelectric tube such as shown in Figure 2 with the mechanical portion of the machine. In this instance, the photoelectric cell would be connected with means for controlling the speed of rotation of the spindles 12 about their axes. Thus, when the machine was moved through the cotton fields, and cotton plants were encountered which did not contain any open cotton bolls, then there would be no rotation of the spindles 12 which would cause an abrasive action on the unmatured cotton bolls. If, however, the cotton bolls had broken open, exposing the matured cotton, then light from a source 19 would be reflected from the white cotton onto the light responsive device, which in turn would cause the spindles 12 to rotate and gather the matured cotton thereon.

The present invention also comprehends the association of a mechanical and pneumatic cotton picker equipped with the light responsive mechanism as herein described, in which the cotton plants undergoing picking are first subjected to picking by the pneumatic mechanism, and then finally subjected to picking by the mechanical mechanism. With the process herein described, it is believed that a detailed description of this type of machine is unnecessary.

From the foregoing description, it will be appreciated that the present invention provides means whereby matured cotton may be picked from the bolls on a cotton plant under a positive control which will render the picking mechanism inoperative when there is no matured cotton in the operative field of the picking mechanism. This type of apparatus is particularly desirable since the plants which do not contain any matured cotton bolls will be substantially undisturbed. Also, there will be no possibility of gathering the unmatured cotton bolls as was the case in certain types of the prior art machines.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a cotton picking machine having ground wheels and a casing and adapted to straddle and traverse a row of cotton, a source of light and a photo-electric cell mounted in the machine, means to deflect the cotton plants toward the photo-electric cell and a cotton removing mechanism controlled by the current generated in the cell in response to the light impinging on the cell from the exposed cotton on the plant.

2. In a cotton harvester machine having ground wheels and a casing, which machine is adapted to straddle and traverse a row of cotton plants, a shielded enclosure within the body of the machine, means to pick cotton from cotton plants, a source of light within the enclosure and means within the enclosure and responsive to light reflected from exposed cotton on the plant to control the operation of said picking means.

3. In a cotton harvester including means to traverse a cotton plant and means to detach matured cotton from the bolls of the cotton plant, in combination, a source of light and photo-responsive means selectively responsive to light reflected from matured cotton, means to connect said photo-responsive means with the detaching means to control the operation of said detaching means.

4. A cotton harvester having means to pick cotton from a cotton plant, in combination, a source of light and a photo-electric cell connected in circuit with the cotton picking means, said photoelectric cell being actuated by light reflected from ripened cotton, and controlling the operation of said cotton picking means.

5. In a cotton harvester having pneumatic means to pick cotton from a cotton plant, a source of light for illuminating the cotton, a photo-responsive means operatively connected with the pneumatic means and selectively actuated by light reflected from exposed matured cotton to control the operation of the pneumatic means.

6. In a cotton harvester having mechanical means to pick cotton from a cotton plant, pneumatic means to pick the cotton from the plant, a source of light for illuminating the cotton and a photo-responsive device actuated by light reflected from matured cotton and means to utilize the current generated in said photo-responsive device to control the operation of one of said means.

7. In a cotton harvester having a pair of rotating drums provided with rotating spindles adapted to pick cotton from the plant, conduits adapted to draw cotton therethrough by means of air pressure, a source of light and photo-responsive means actuated by light reflected from ripened cotton and means to utilize the current generated in said photo-responsive means to control the operation of said pneumatic means.

8. A cotton harvester comprising a machine adapted to straddle and traverse a row of cotton plants, means mounted on the machine to remove cotton from the bolls of the plants straddled, means to deflect the cotton plants into close proximity to said picking means, a source of light illuminating the cotton plants, and photo-responsive means connected with the cotton removing means to control the operation of said picking means actuated by light illuminating the cotton plants.

9. In a cotton harvester machine having ground wheels and a casing, which machine is adapted to straddle and traverse a row of cotton plants, a light shielded enclosure within the body of the machine, means to remove cotton from cotton plants, a source of light, a photo-electric cell mounted within the enclosure and responsive to the light reflected from exposed cotton on the plant, means to connect the cell with the cotton removing means to control the operation of said picking means.

MARTIN J. CONNOLLY.